United States Patent [19]
Haley et al.

[11] 3,790,437
[45] Feb. 5, 1974

[54] POLYVINYL ALCOHOL FIBER REINFORCED POLYURETHANE COMPOSITIONS AND PRODUCTS THEREFROM

[75] Inventors: John S. Haley, Lake Junaluska; Jerry W. Cooper; Arthur D. Logan, both of Waynesville, all of N.C.

[73] Assignee: Dayco Corporation, Dayton, Ohio

[22] Filed: Apr. 20, 1972

[21] Appl. No.: 245,911

Related U.S. Application Data
[63] Continuation-in-part of Ser. No. 71,237, Sept. 10, 1970, abandoned.

[52] U.S. Cl. ............... 161/170, 161/169, 161/190, 260/859
[51] Int. Cl. ........................... B32b 5/02, B32b 5/16
[58] Field of Search .... 161/169, 170, 190; 156/244; 260/859 R

[56] References Cited
UNITED STATES PATENTS
3,533,884  10/1970  Quackenbush ................. 156/244

FOREIGN PATENTS OR APPLICATIONS
804,669    11/1958  Great Britain ................. 161/190
1,905,551  8/1969   Germany ...................... 117/138.8

Primary Examiner—Harold Ansher
Assistant Examiner—Ellis P. Robinson

[57] ABSTRACT

A reinforced composition of improved physical properties is obtained by incorporating polyvinyl alcohol fibers or particles into curable liquid urethane prepolymers or thermoplastic urethane polymers. A strong chemical adhesion is obtained between the polyvinyl alcohol and urethane.

7 Claims, No Drawings

POLYVINYL ALCOHOL FIBER REINFORCED POLYURETHANE COMPOSITIONS AND PRODUCTS THEREFROM

BACKGROUND OF THE INVENTION

This application is a continuation-in-part of U. S. application Ser. No. 71,237, filed Sept. 10, 1970, now abandoned.

Heretofore, products such as lawn mower blades, tubing, textile machinery components such as pickers, and other molded industrial products which are exposed to severe tearing, twisting, abrasion, impact, and other forces, have been manufactured with polyurethane compositions reinforced with such materials as polyester fibers. One of the problems with polyester reinforcing materials is that they must be precoated with an adhesive; for example, an isocyanate system, in order to adhere to the polyurethane composition for the purpose of improving the physical properties of the final product. The precoating step is costly and the adhesive strength provided by the coated fibers tends to diminish with time and exposure of the material to moist conditions prior to combination with the polyurethane component.

It is known in the art that the physical properties of reinforced polyurethanes can be improved by the addition of fibrous material. For example, improved tear resistance has been found to occur when fibrous flock, such as cellulose flock, nylon flock, glass flock, and wool flock, is used as a filler in a polyurethane polymer, as disclosed in U. S. Pat. No. 2,751,363. Polyurethane foams have been improved in physical properties by the addition of short length nylon, wool, silk, hair, and protein fibers, as disclosed in U. S. Pat. No. 2,763,624. Also, glass fibers have been used to reinforce nonelastomeric polyurethanes to produce low elongation properties, as disclosed in U. S. Pat. No. 3,464,935. None of the above compositions, however, have provided a balanced blend of physical properties of the type required for lawn mower blades, loom pickers, tubing, and the like.

SUMMARY OF THE INVENTION

The present invention is directed to improved polyurethane compositions in which a strong chemical adhesion is obtained between the reinforcing material and the polyurethane material. In general, the invention increases tear strength, modulus, and other desirable mechanical properties of castable and thermoplastic polyurethane products, such as lawn mower blades, tubing, and loom pickers. The basic combination of the present invention comprises a mixture of a polyvinyl alcohol (PVA) reinforcing material and a polyurethane polymer or prepolymer which is the reaction product of an organic diisocyanate and a material selected from the group consisting of polyesters and polyethers. The improved properties of the present invention are believed to result from a reaction between pendant hydroxyl groups on the PVA material and terminal isocyanate groups on the polyurethane chain by which the polyurethane chemically bonds with the PVA reinforcing material.

The preferred composition comprises a mixture of up to about 15 percent by weight of discrete untreated PVA fibers and a polyurethane prepolymer, a typical mixture having about 5 percent by weight. The fibers are preferably formed to a length of about one-sixteenth to one-fourth inch. A higher percentage of PVA causes problems of handling in casting operations, due to the high viscosity of the mix. In injection molding operations, on the other hand, the thermoplastic composition comprises a mixture of up to about 30 percent by weight of PVA fibers and a polyurethane polymer, the mixture generally being formed into pellets for subsequent processing. The resultant compositions exhibit increased tear strength and other desirable characteristics.

DESCRIPTION OF THE PREFERRED EMBODIMENT

Elastomeric polyurethane products, such as tubing, lawn mower blades, textile machinery components, and other molded industrial products, require exceptional physical properties due to the operating stresses applied to them. The novel elastomeric urethane compositions of the present invention provide significant processing advantages for certain types of products. The present invention is directed to the combination comprising a mixture of a polyvinyl alcohol (PVA) reinforcing material and a polyurethane polymer or prepolymer. This combination increases the tear strength, modulus, and other desirable mechanical properties of castable polyurethane products, such as tubing, lawn mower blades, and loom pickers.

The basic feature on which the present invention depends is a strong chemical adhesion that is obtained between the surface of the PVA reinforcing material and the urethane material consisting of the reaction product of an organic polyfunctional isocyanate with a polyester or a polyether. Chemically, pendant active hydroxyl groups present on the PVA chain are believed to react with the isocyanate terminated urethane polymers to form a strong chemical bond. The penetration effect results from the saturation of interlocked yarn bundles by the urethane when liquid. Since chopped fibers do not interlock there would be no mechanical adhesion.

The basic combination of the present invention utilizes PVA in the form of discrete fibers or particles, and is particularly adaptable for the production of cast products, such as lawn mower blades, textile machinery components, and the like, and also for the production of injection molded and extruded products, such as tubing and the like.

The PVA fibers are usually formed by chopping PVA cord into short lengths, on the order of one-sixteenth to one-fourth inch, and are used in the preparation of two polyurethane compositions, a castable polyurethane prepolymer, and a thermoplastic polyurethane polymer. The PVA fibers are particularly suited for the castable polyurethane prepolymers because the composition can be maintained in the stable liquid form until curing agents are added when the products are cast. They are also particularly suited for injection molded or extruded products, because they can be mixed with the thermoplastic polyurethane resin and formed into polymer pellets prior to processing.

The castable polyurethane prepolymer compositions preferably include small quantities of discrete PVA fibers, on the order of about 5 percent by weight of the total fiber/prepolymer mixture, but may include up to 15 percent by weight of the fibers. Compositions with a proportion of PVA fibers greater than 15 percent have too high a viscosity and are difficult to handle in casting operations.

The polyester and polyether prepolymers may be prepared by well known methods; for example, the polyester may be prepared by reaction of a dicarboxylic acid and a dihydric alcohol to give an intermediate product which is subsequently reacted with a di or tri-functional isocyanate while the polyether may be prepared by linear polymerization of an alkyl oxide, followed by reaction with a suitable di or tri-functional isocyanate. A stable liquid is obtained by using an excess of the isocyanate, to provide free isocyanate groups for lengthening the polymer chain and for interaction with the polyvinyl alcohol fibers. Suitable curing agents are triethylene glycol and methylene bis (o-chloroaniline).

In the thermoplastic polyurethane polymer compositions, the PVA fibers are incorporated directly into the polymer to be used for injection molded products, or extruded products such as tubing. The polyester and polyether polymers may be prepared as outlined above, except that in the case of these compositions, an excess of isocyanate is not preferred and the proportion of PVA fibers is preferably between 1 percent and 30 percent by weight of the total fiber/polymer mixture to facilitate processing operations.

The urethane polymerization may take place by polymer formation (one-shot process) or by chain extension (prepolymer process). This is illustrated by the following structural formulae:

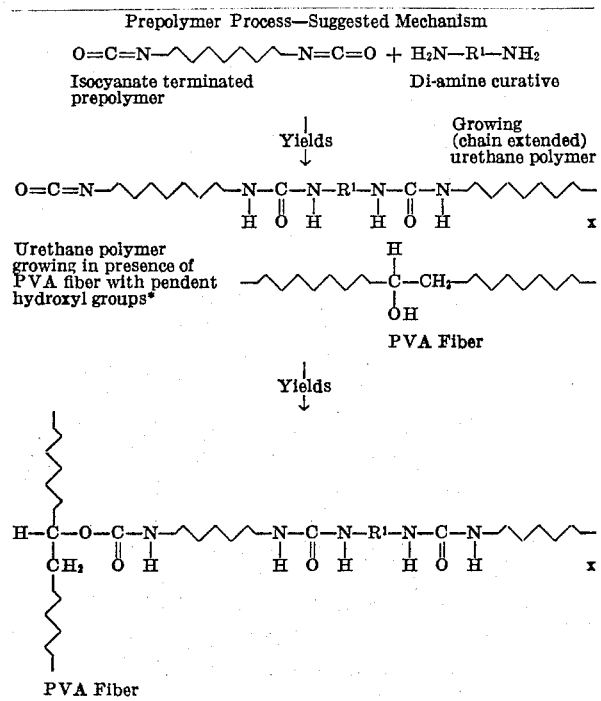

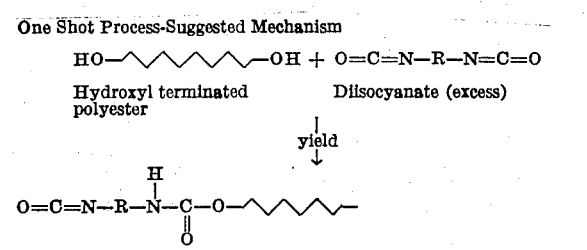

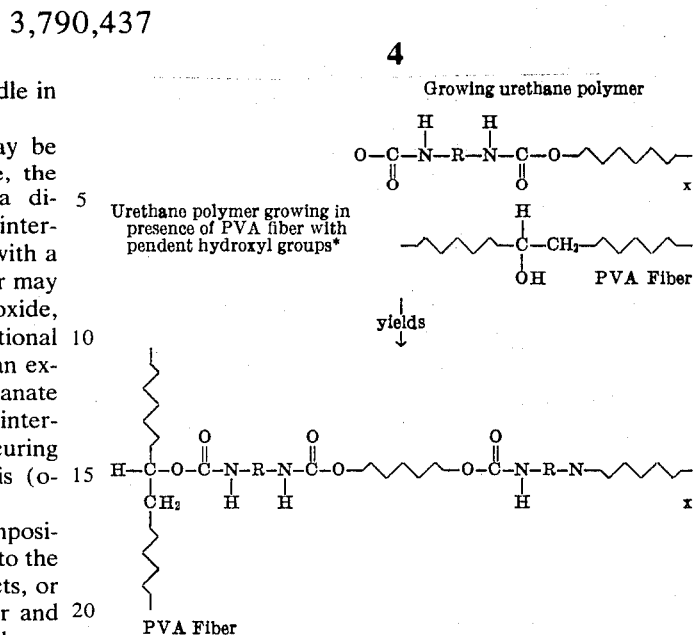

*Growth of polymer and interaction of growing polymer with PVA filament are felt to occur simultaneously.

Compositions such as described above provide increased tear strength, modulus, and other desirable mechanical properties. One improved property is elongation. In tests performed to compare the breaking point elongation of cast polyurethane compositions reinforced with 3 to 5 percent of untreated chopped PVA fibers by weight, with the elongation of compositions without reinforcing materials, the elongation of the reinforced material proved to be significantly improved:

| Reinforcing Material | Elongation |
| --- | --- |
| PVA Fiber (untreated) | 50–75% |
| None | 600–700% |

Tear strength, however, is the most significantly improved property. For example, the average tear strength of polyurethane compositions reinforced with 3 to 5 percent of untreated discrete PVA fibers was found to be nearly three times that of the same compositions reinforced with 3 to 5 percent treated polyester fiber:

| Reinforcing Material | Tear Strength (pli) |
| --- | --- |
| PVA (untreated) | 254 |
| Polyester (treated) | 86 |

This surprising increase in tear strength is believed to be the result of the reaction between the pendant hydroxyl groups on the PVA fibers and the terminal isocyanate groups on the polyurethane chain, and also the mechanical adhesion between the urethane and the chopped fibers. The improved tear strength is particularly advantageous for lawn mower blades, textile machinery components, tubing, and other industrial compounds, as these products operate under prolonged stress and are subjected to rough treatment. In addition, these products require strength in all directions and therefore the chopped fiber embodiment, which provides strength in all directions, rather than in one particular direction, is particularly suited for their manufacture.

While the compositions and products herein described constitute preferred embodiments of the invention, it is to be understood that the invention is not limited to these precise compositions and products, and that changes may be made therein without departing from the scope of the invention which is defined in the appended claims.

We claim:

1. A polyurethane elastomer composition characterized by improved tear strength and dimensional stability; comprising a polyurethane material which is the reaction product of an organic polyisocyanate and a material selected from the group consisting of polyesters and polyethers, said polyurethane having terminal isocyanate groups; and untreated discrete polyvinyl alcohol fibers present as a reinforcing material for said polyurethane and constituting from 1 to about 30 percent by weight of the total polyurethane-polyvinyl alcohol mixture, said polyvinyl alcohol having pendant hydroxyl groups; said polyurethane material cured in admixture with said polyvinyl alcohol fibers to enable said isocyanate groups to react with said hydroxyl groups and said fibers to establish chemical as well as mechanical bonds.

2. The composition of claim 1 wherein said fibers have a length of about one-sixteenth to one-fourth inch.

3. The composition of claim 1 wherein said polyurethane material is a castable liquid polyurethane prepolymer and said fibers constitute from 1 to about 15 percent by weight of the total polyurethane-polyvinyl alcohol mixture.

4. The composition of claim 3 made in the form of a lawn mower blade.

5. The composition of claim 3 made in the form of textile machinery components.

6. The composition of claim 1 made in the form of extruded tubing.

7. The composition of claim 1 made in the form of injection molded products.

* * * * *